Aug. 17, 1937. A. BATEY 2,090,322
STEERING WHEEL SWITCH OPERATING APPARATUS
Filed Aug. 25, 1936
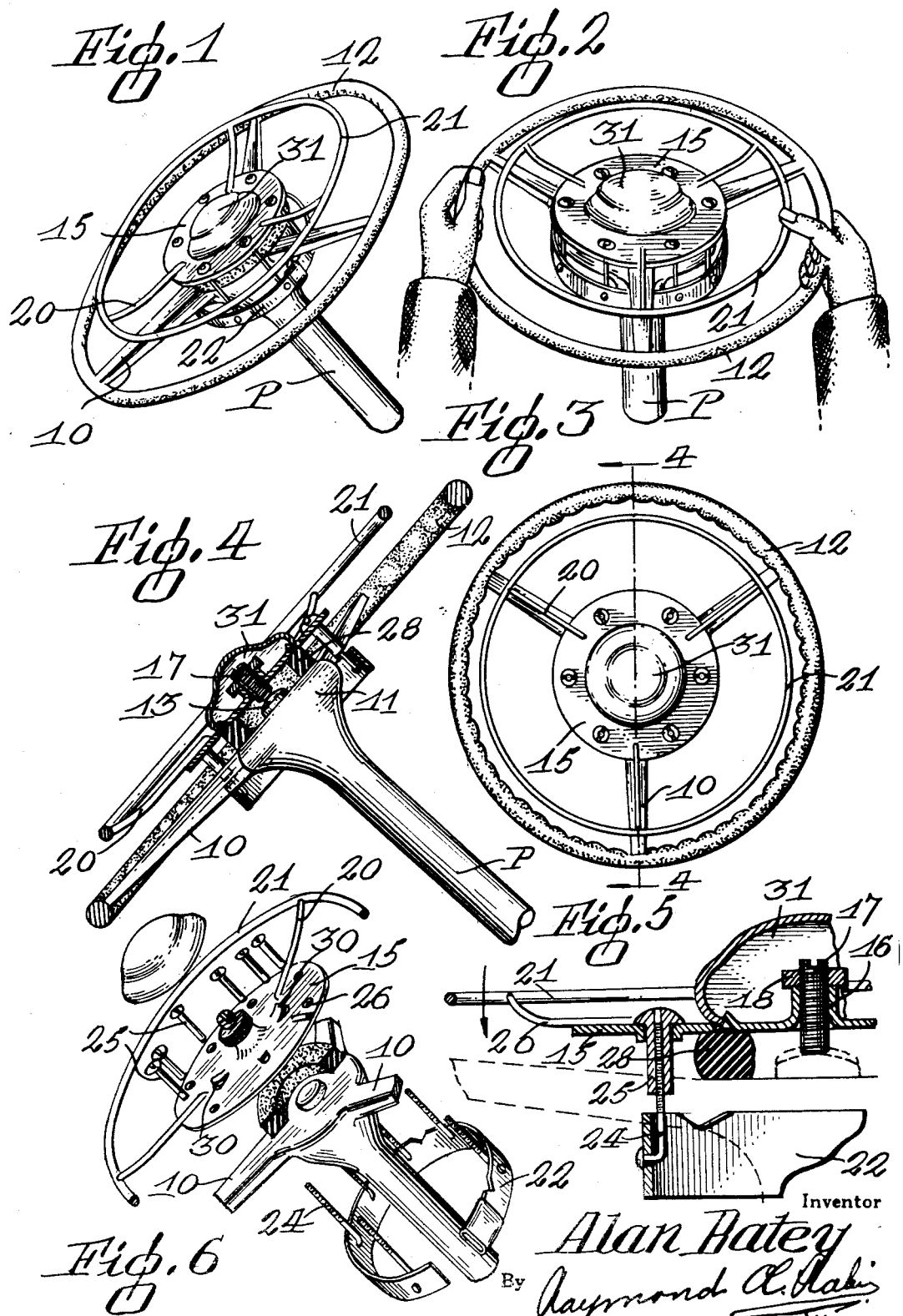

Patented Aug. 17, 1937

2,090,322

UNITED STATES PATENT OFFICE 2,090,322

STEERING WHEEL SWITCH OPERATING APPARATUS

Alan Batey, Montreal, Quebec, Canada

Application August 25, 1936, Serial No. 97,817

3 Claims. (Cl. 74—484)

The present invention relates to an extension switch operating apparatus for automobiles and the like.

An object of the invention is the provision of an apparatus adapted to be mounted on the steering wheel of a vehicle to enable convenient operation of a switch element without removal of the hands from the rim of the steering wheel.

Another object of the invention is the provision of an extension operating apparatus of the above character designed so as to enable quick and easy installation on steering wheels of many different makes of automobiles.

Another object of the invention is the provision of an operating apparatus of the aforesaid character which is reliable in operation.

A still further object of the invention is the provision of an operating apparatus of the above character which is relatively simple and inexpensive in construction.

Other objects and advantages of the invention will become apparent as the description progresses.

In the accompanying drawing forming a part of this specification and in which like reference characters are employed to designate corresponding parts throughout the same:

Figure 1 is a side perspective view of the apparatus installed on a steering wheel, Figure 2 is a rear perspective view of the same, Figure 3 is a top plan view of the same, Figure 4 is a section taken on the line 4—4 of Figure 3, Figure 5 is an enlarged section through the operating apparatus, and Figure 6 is a perspective view, partly in section, showing the apparatus in detached arrangement.

Referring to the drawing, wherein for the purpose of illustration is shown a preferred embodiment of the invention, P designates the steering post of an automobile equipped at the upper end with a conventional steering wheel embodying a plurality of, in the present instance three, spokes 10 extending radially from an enlarged hub forming portion 11 at the top of the steering post P and connecting with an annular steering wheel rim 12. In the upper central portion of the enlarged part of the steering post P is mounted a resiliently depressible button 13 operable, when depressed, to close a switch for operation of the vehicle horn which is connected in circuit therewith. As noted at Figures 4 and 6, this button projects above the relatively flat top surface of the steering post.

An important feature of my invention is the provision of a member to be mounted above the steering wheel and relative to the switch actuating button 13, so that depression of the edge or rim of the member at any point thereof will cause depression of the button 13 and operation of the horn or other electric circuit. Furthermore, the operating member is to form an extension which will enable convenient operation by the thumb or a finger of the operator, while the hand thereof is retained in a steering wheel gripping position.

The extension operating member, in the present example, embodies a device in the form of an auxiliary wheel embodying a central metallic disc 15 formed at its centre with an interiorly threaded axially extending socket 16 in which is threadedly fitted a screw 17 having a groove in the upper end. The screw may be secured in adjusted position in the socket by means of a locknut 18 fitted on the outer portion and bearing against the upper end of the socket.

On the disc 15 are formed a plurality of, in the present instance three, radial spoke elements 20 projecting beyond the edge of the disc and in the present instance curved slightly upward. The outer ends of the spokes 20 are rigidly secured to an annular rim 21.

Below the steering wheel is positioned a fastening ring 22, normally contacting with the underside of the steering wheel spokes 10 at points spaced from the hub portion of the steering wheel. To the fastening ring 22 are connected a plurality of, in the present instance six, rods or wires 24 bent at the lower ends to project through holes in the fastening ring and formed with knobs on the bent ends. A plurality of interiorly threaded sleeves 25 are formed to engage the upper threaded portions of the rods 24 and extend through holes 26 arranged at spaced intervals in the disc and are preferably formed with enlarged heads which hold the sleeves in place. This provides a fastener which may be quickly and easily assembled or detached and which may be readily adjusted for mounting the auxiliary operating wheel in proper position relative to the horn button.

Between the extension wheel and the hub portion of the steering wheel is positioned a resilient spacer element 28 preferably a circular pad of sponge rubber or the like. This element is disposed beneath the disc 15 of the extension wheel.

A plurality of bent up prongs 30 are struck from the disc 15 for engaging the inturned edge portion of a dome-shaped cover cap 31 which is to be removably fitted on the auxiliary wheel to normally conceal the socket 16 and the screw 17.

The apertures formed as a result of striking out the prongs 30 serve to engage bulging portions of of the resilient spacer pad 28 and to retain the same in proper concentric position.

The extension structure is assembled on the steering wheel by disposing the auxiliary frame or wheel above the steering wheel and positioning the spacer pad between the centre or hub portions of the two wheels. The fastening ring 22 is arranged concentrically about the hub and beneath the spokes of the steering wheel so that the fastening elements may be connected so as to mount the extension wheel in a position approximately parallel with the steering wheel. The contact screw 17 is thereafter adjusted so that it lightly contacts with the top of the horn switch button 13. When thus arranged, the rim of the switch operating wheel will assume a position somewhat above and inwardly of the steering wheel rim and will be conveniently accessible for depression by the thumbs of the driver. A relatively slight depression of any part of the extension wheel will cause circuit closing depression of the switch button and operation of the horn. The resilient pad 28 will automatically restore the extension wheel to its normal non-operating position when released, while the switch button is raised to break the switch contact by independent resilient means.

This construction will provide an operating extension which may be fitted on the steering wheels of practically all well-known makes of cars and will enable rapid and convenient operation of the horn while maintaining complete control of the vehicle, inasmuch as the extension structure may be operatively depressed by the thumb while the other fingers of the hand are retained in clasped position on the rim of the steering wheel.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:—

1. In a device for operating the depressible switch button on a vehicle steering wheel, a plate adapted to be disposed over the central portion of the steering wheel, a peripheral operating extension attached to the said plate, a switch button engaging element mounted on the plate, a continuous annular member of resilient material interposed between the plate and the steering wheel arranged concentrically about the switch button, the said annular member being adapted to normally support the plate in a non-operating position and yieldable to allow tiltable movement for operation of the button by the operating element, a plurality of fastening elements detachably connected to the plate, and a ring disposed below the steering wheel connected with the said fastening elements for tiltably mounting the operating plate on the steering wheel.

2. In a device for operating the depressible switch button on a vehicle steering wheel, a plate adapted to be disposed over the central portion of the steering wheel, a concentric operating rim attached to the plate, an interiorly threaded socket formed axially on the plate, a screw fitted in the socket and adapted to engage the switch button, a lock nut threaded on the screw and engageable with the socket to lock the screw in adjusted position, an annular member of resilient rubber interposed between the plate and the steering wheel to yieldingly hold the plate in tiltable position thereon, and means for detachably fastening the plate on the steering wheel whereby the plate may be tilted to operate the switch button.

3. A device for operating the depressible switch button on a vehicle steering wheel comprising a disc adapted to be mounted above the central portion of the steering wheel, an axially adjustable contact member in the centre of the disc disposed to engage a switch button, a plurality of spokes extending radially from the disc, an annular rim connected to the outer ends of the spokes, the said rim being adapted to assume a position inwardly of and in a plane offset above the rim of the steering wheel, an annular pad of resilient material disposed between the disc and the central portion of the steering wheel adapted to yieldingly support the disc so that the contact member is normally retained in a non-operating position, and means connecting the marginal portions of the disc with the steering wheel so as to allow tilting operative movement of the disc.

ALAN BATEY.